(12) United States Patent
Fuwa et al.

(10) Patent No.: US 8,486,490 B2
(45) Date of Patent: Jul. 16, 2013

(54) METHOD FOR PRODUCING A THREE-DIMENSIONALLY SHAPED OBJECT

(75) Inventors: Isao Fuwa, Osaka (JP); Norio Yoshida, Kitakatsuragi (JP); Satoshi Abe, Moriguchi (JP)

(73) Assignee: Panasonic Corporation, Osaka (JP)

( * ) Notice: Subject to any disclaimer, the term of this patent is extended or adjusted under 35 U.S.C. 154(b) by 580 days.

(21) Appl. No.: 12/461,311

(22) Filed: Aug. 7, 2009

(65) Prior Publication Data

US 2010/0034983 A1 Feb. 11, 2010

(30) Foreign Application Priority Data

Aug. 8, 2008 (JP) ................................. 2008-206141

(51) Int. Cl.
*B05D 3/12* (2006.01)
*B05D 3/00* (2006.01)
*B05D 3/06* (2006.01)

(52) U.S. Cl.
USPC ............................. 427/327; 427/299; 427/554

(58) Field of Classification Search
USPC ................. 427/532, 553, 554, 555, 557, 558, 427/559
See application file for complete search history.

(56) References Cited

U.S. PATENT DOCUMENTS

| | | | |
|---|---|---|---|
| 3,934,334 A * | 1/1976 | Hanni | 29/846 |
| 5,496,593 A * | 3/1996 | Tsai et al. | 427/556 |
| 6,042,774 A | 3/2000 | Wilkening et al. | |
| 6,103,402 A * | 8/2000 | Marcin et al. | 428/637 |
| 6,391,251 B1 | 5/2002 | Keicher et al. | |
| 2004/0056022 A1* | 3/2004 | Meiners et al. | 219/634 |
| 2005/0133527 A1* | 6/2005 | Dullea et al. | 222/1 |
| 2007/0023977 A1 | 2/2007 | Braun et al. | |
| 2010/0279023 A1* | 11/2010 | Kusinski et al. | 427/455 |

FOREIGN PATENT DOCUMENTS

| | | |
|---|---|---|
| WO | 2005/002578 A1 | 1/2005 |
| WO | 2005/025781 A1 | 3/2005 |

OTHER PUBLICATIONS

Chinese Office Action dated Sep. 14, 2010 and English translation thereof.
German Office Action in corresponding German Application No. 10 2009 036 648.2, dated Jun. 14, 2012 with English translation.
German Office Action in corresponding German Application No. 10 2009 036 648.2, dated Sep. 13, 2012 with English translation.

* cited by examiner

*Primary Examiner* — Dah-Wei Yuan
*Assistant Examiner* — Nga Leung V Law
(74) *Attorney, Agent, or Firm* — Bacon & Thomas, PLLC

(57) ABSTRACT

In a method for producing a three-dimensionally shaped object, a powder layer is formed by feeding a powdery material to a substrate and a solidified layer is formed by irradiating a light beam on a specified portion of the powder layer to sinter or melt the specified portion of the powder layer. A three-dimensionally shaped object having a plurality of solidified layers laminated one above another is obtained by repeating the powder layer formation and the solidified layer formation. In the method, a stress is preliminarily applied to the substrate to reduce the amount of deformation of the substrate after production of the shaped object prior to the powder layer forming step.

6 Claims, 8 Drawing Sheets

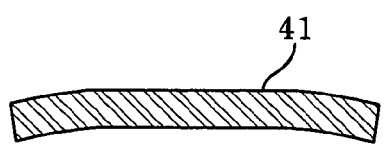
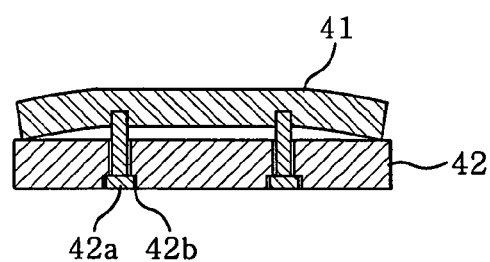
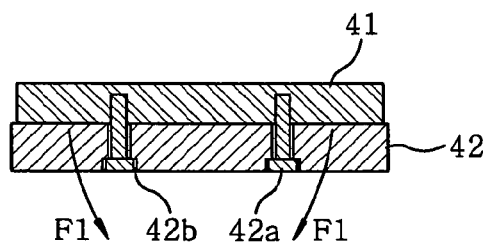
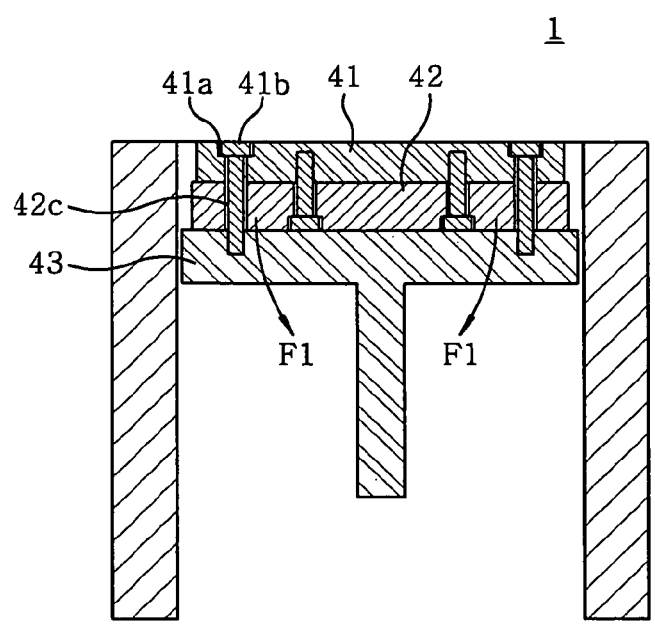

DEFORMED

DEFORMED

41

SURFACE ROUGHENING

41

DEFORMED

METHOD FOR PRODUCING A THREE-DIMENSIONALLY SHAPED OBJECT

FIELD OF THE INVENTION

The present invention relates to a method for producing a three-dimensionally shaped object by irradiating a light beam on an inorganic or organic powdery material.

BACKGROUND OF THE INVENTION

Conventionally, there is known a method for producing a three-dimensionally shaped object (hereinafter simply referred to as a "shaped object") by irradiating a light beam on a specified portion of a powder layer of an inorganic or organic powdery material and sintering or melting the specified portion of the powder layer to form a solidified layer, forming a new powder layer on the solidified layer, irradiating the light beam on a specified portion of the new powder layer to form a new solidified layer and repeating the afore-mentioned steps.

Also known in the art is a method for producing a shaped object by placing a substrate on a vertically movable shaping table, forming a powder layer on the substrate and sintering the powder layer (see, e.g., Japanese Patent Laid-open Publication No. 8-281807). FIG. 9A schematically shows the cross section of a metal optical shaping machine (hereinafter simply referred to as an "optical shaping machine") used in such a production method. FIG. 9B illustrates the cross section of a shaped object produced by the optical shaping machine. A substrate 41 is installed on a vertically movable table 43. A powder layer 21 is formed on the substrate 41. A light beam L is irradiated on a specified portion of the powder layer 21 to sinter the same into a solidified layer 22. The solidified layers 22 thus formed are laminated to produce a shaped object 3.

In the shaped object production method disclosed in Japanese Patent Laid-open Publication No. 8-281807, however, the shaped object 3 is shrunken when it is cooled after being heated by sintering. This generates a tensile stress by which the surface of the substrate 41 bonded to the shaped object 3 is pulled toward the center. The peripheral portion of the substrate 41 is bent upwards by the upward bending moment F2 caused by the tensile stress. This may possibly render the shape of the shaped object 3 poor if the substrate 41 is not removed from the shaped object 3 after the shaping operation but used as a part of the shaped object 3.

SUMMARY OF THE INVENTION

In view of the above, the present invention provides a method for producing a three-dimensionally shaped object, which is capable of suppressing the post-shaping warp and deformation of a substrate and also capable of reducing the possibility of a shaped object becoming poor in shape.

In accordance with an aspect of the present invention, there is provided a method for producing a three-dimensionally shaped object, which includes a powder layer forming step for forming a powder layer by feeding a powdery material to a substrate; a solidified layer forming step for forming a solidified layer by irradiating a light beam on a specified portion of the powder layer to sinter or melt the specified portion of the powder layer; and a step of repeating the powder layer forming step and the solidified layer forming step to produce a three-dimensionally shaped object having a plurality of solidified layers laminated one above another, the method including: a stress applying step for preliminarily applying a stress to the substrate to reduce the amount of deformation of the substrate after production of the shaped object prior to the powder layer forming step.

With such configuration, the substrate is pre-stressed in the stress applying step by taking into account an anticipated warp and deformation which would occur in the substrate after a shaping operation. As a result, the bending moment caused by the thermal stress generated in the substrate during the shaping operation is offset by the bending moment caused by the stress preliminarily applied to the substrate. This suppresses the post-shaping warp and deformation of the substrate and reduces the possibility of the shaped object becoming poor in shape.

The stress applying step may include preliminarily forming the substrate into a bent shape by a machining work and then fixing the substrate to a rigid table so that the substrate becomes substantially planar.

With such configuration, the substrate is preliminarily machined into a bent shape by taking into account the anticipated warp and deformation which would occur in the substrate after a shaping operation. This makes it possible to process the substrate with high accuracy.

Alternatively, the stress applying step may include heating, with a heating unit, one surface of the substrate on which the three-dimensionally shaped object is not placed and then fixing the substrate to a rigid table so that the substrate becomes substantially planar.

With such configuration, the substrate is processed by the heat treatment. This makes it possible to deform the substrate within a short period of time.

In this case, the heating unit may be configured to irradiate a light beam.

With such configuration, the substrate can be deformed by the light beam used in the shaping operation. This eliminates the need to employ an additional heating device, which assists in reducing the cost.

Further, the heating unit may irradiate the light beam on a surface of the substrate opposite to a surface on which the light beam is irradiated in the solidified layer forming step, along substantially the same irradiation route as the light beam irradiation route used in the solidified layer forming step.

With such configuration, substantially the same portion of the substrate is heated from the front and rear surfaces thereof. Thus the stresses developed in the front and rear surfaces are offset by each other, which makes it possible to suppress the post-shaping warp and deformation of the substrate.

Furthermore, the stress applying step may include performing shot blast with respect to one surface of the substrate on which the three-dimensionally shaped object is placed and then fixing the substrate to a rigid table so that the substrate becomes substantially planar.

With such configuration, the surface roughness of the substrate is increased by shot blast. This ensures that the substrate and the solidified layer firmly adhere to each other, thereby reducing the possibility of separation of the shaped object and the substrate.

In accordance with another aspect of the present invention, there is provided a method for producing a three-dimensionally shaped object, which includes a powder layer forming step for forming a powder layer by feeding a powdery material to a substrate; a solidified layer forming step for forming a solidified layer by irradiating a first light beam on a specified portion of the powder layer to sinter or melt the specified portion of the powder layer; and a step of repeating the powder layer forming step and the solidified layer forming step to produce a three-dimensionally shaped object having a plurality of solidified layers laminated one above another, wherein: a second light beam is irradiated on a predetermined portion of a rear surface of the substrate, while irradiating the first light beam on the specified portion of the powder layer in the solidified layer forming step, so that the amount of deformation of the substrate after production of the shaped object is reduced.

With such configuration, the substrate is heated from the opposite surfaces thereof with the same kind of heat source. Thus the downward bending moment and the upward bending moment are generated in a generally equal magnitude and are offset by each other. This makes it possible to suppress the post-shaping warp and deformation of the substrate.

BRIEF DESCRIPTION OF THE DRAWINGS

FIG. 4A is a section view showing a substrate used in the production method of the first embodiment, FIGS. 4B and 4C are section views showing a substrate attached to an installation plate, FIG. 4D is a section view showing an optical shaping machine in which a substrate is fixed to a table.

DETAILED DESCRIPTION OF THE PREFERRED EMBODIMENTS

First Embodiment

A method for producing a three-dimensionally shaped object (hereinafter simply referred to as a "shaped object") in accordance with a first embodiment of the present invention will now be described with reference to the accompanying drawings.

Figure 1:
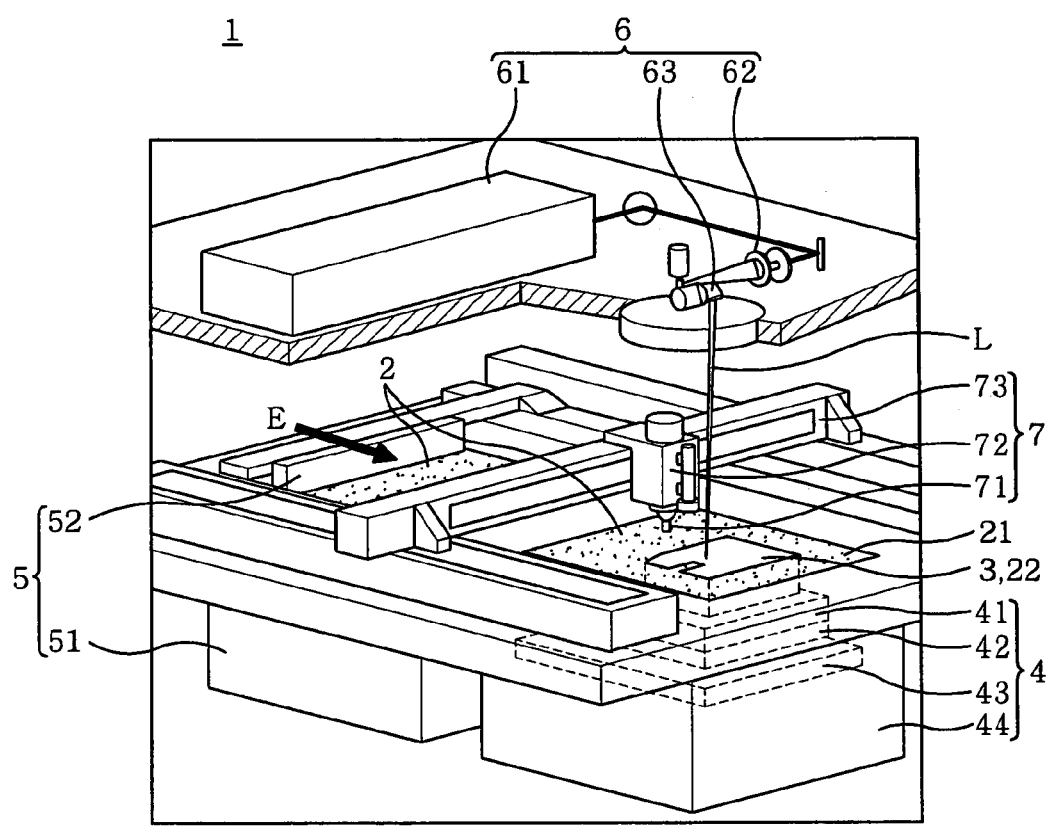
FIG. 1 is a perspective view showing an optical shaping machine used in a production method in accordance with a first embodiment of the present invention.

FIG. 1 shows the schematic configuration of a metal optical shaping machine (hereinafter simply referred to as an "optical shaping machine") used in the production method of the first embodiment. The optical shaping machine 1 includes a shaping unit 4 for producing a shaped object 3 from a metallic powder (or a powdery material) 2, a powder layer forming unit 5 for forming a powder layer 21 by feeding the metallic powder 2 to the shaping unit 4, a solidifying unit 6 for forming a solidified layer 22 by irradiating a light beam L on a specified portion of the powder layer 21 and a cutting and removing unit 7 for cutting the peripheral portion of the shaped object 3.

The shaping unit 4 includes a substrate 41 on which the powder layer 21 is put, an installation plate 42 to which the substrate 41 is attached, a table 43 for holding the substrate 41 to move the same up and down, and a shaping tank 44 for accommodating therein the substrate 41, the installation plate 42 and the table 43. The powder layer forming unit 5 includes a powder tank 51 for holding and pushing up the metallic powder 2 and a powder supply blade 52 movable in the direction indicated by an arrow E for putting the pushed-up metallic powder 2 on the substrate 41 to form the powder layer 21.

The solidifying unit 6 includes a light beam oscillator 61 for emitting a light beam L, a collecting lens 62 for collecting the light beam L and a galvano-mirror 63 for projecting the collected light beam L on the powder flayer 21. The cutting and removing unit 7 includes a cutting tool 71 for cutting the shaped object 3, a milling head 72 for holding the cutting tool 71 and an XY drive unit 73 for moving the milling head 72 to a cutting position. The metallic powder 2 may be, e.g., an iron powder having an average particle size of 20 μm. The light beam may be, e.g., a $CO_2$ laser beam or an Nd-YAG laser beam. The substrate 41 may be made of a material similar to the metallic powder 2 or a material coherent to the metallic powder 2 as sintered. The optical shaping machine 1 further includes a control unit (not shown) for controlling the operations of the respective units.

Figure 2A:
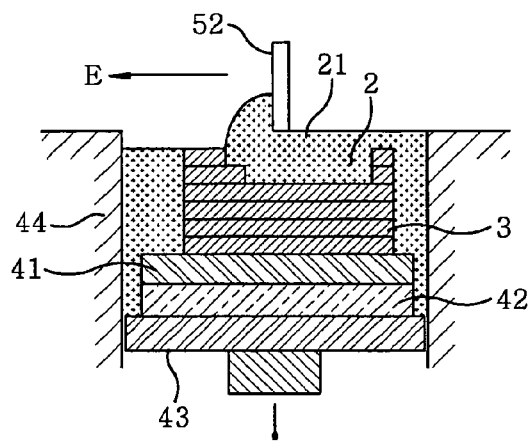
FIGS. 2A to 2C are views illustrating the production method of the first embodiment in a time series.
Figure 2B:
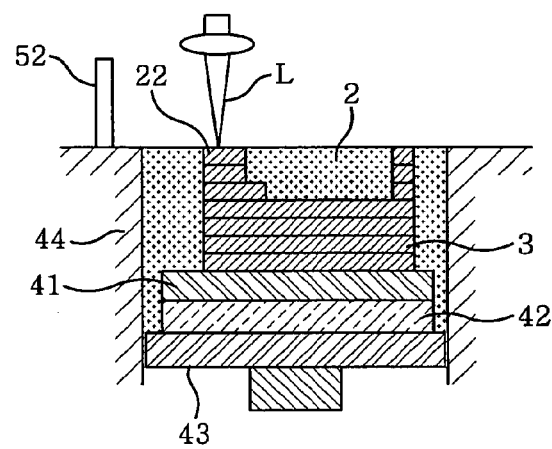
Figure 2C:
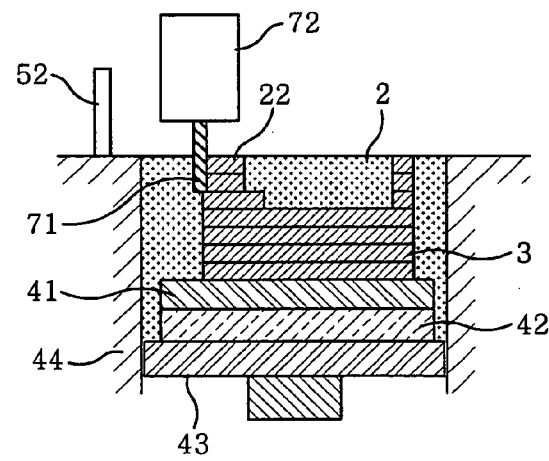
Figure 3:
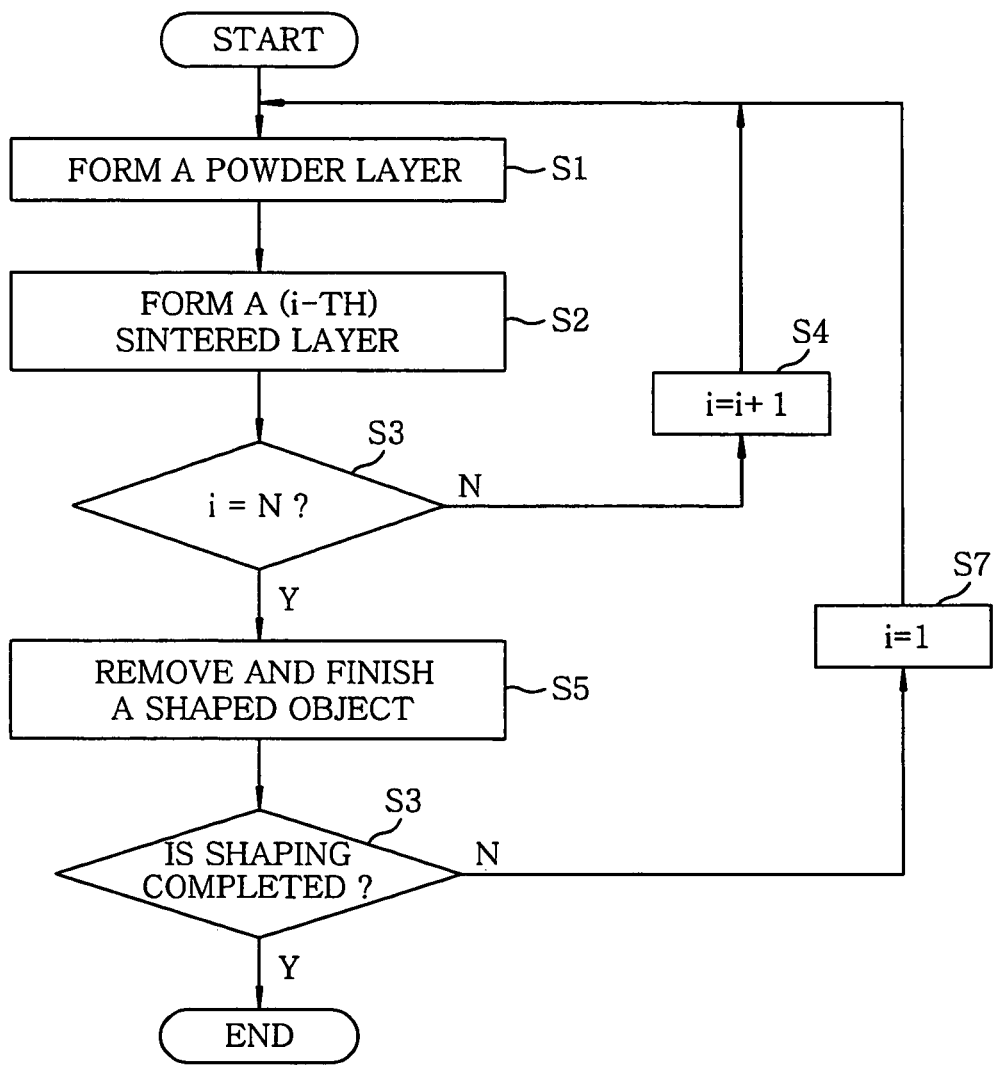
FIG. 3 is a flowchart illustrating the production method of the first embodiment.

FIGS. 2A through 2C illustrate the operation of the optical shaping machine, and FIG. 3 is a flowchart of the shaped object production method. As shown in FIG. 2A, the control unit causes the table 43 to move down. Then, the powder supply blade 52 is caused to move in the direction indicated by the arrow E. The metallic powder 2 contained in the powder tank 51 (see FIG. 1) is fed to above the substrate 41, thus forming the powder layer 21. This step corresponds to the powder layer forming step (step S1) illustrated in FIG. 3. Referring next to FIG. 2B, the light beam L is projected on a specified portion of the powder layer 21 by use of the galvano-mirror 63 (see FIG. 1) to sinter the metallic powder 2, thus forming a solidified layer 22 united with the substrate 41. This step corresponds to the solidified layer forming step (step S2) illustrated in FIG. 3. The i-th solidified layer is formed in this way, wherein the "i" is an integer. The irradiation route of the light beam L is set based on the contour data of the respective cross-sections obtained by slicing, at an equal pitch of, e.g., 0.05 mm, the STL (Stereo Lithography) data originating from a three-dimensional CAD model. The irradiation route is preferably set to ensure that at least the outermost surface of the shaped object 3 has high density with the porosity of 5% or less.

The powder layer forming step (S1) shown in FIG. 2A and the solidified layer forming step (S2) shown in FIG. 2B are repeatedly performed to laminate a plurality of solidified layers 22 one above another. Lamination of the solidified layers 22 is repeated until the layer number i grows equal to a target layer number N (steps S1 through S4). The target layer number N is calculated from the effective blade length of the cutting tool 71 used in cutting the surface of the shaped object 3. For example, if the cutting tool 71 is a ball end mill having a diameter of 1 mm and an effective blade length of 3 mm capable of cutting a workpiece to 3 mm depth and if the thickness of the power layer 21 is 0.05 mm, the target layer number N is set equal to fifty layers, in which case the thickness of the laminated powder layers 21 becomes 2.5 mm. If the number i of the solidified layers 22 reaches the target layer number N, the control unit causes the XY drive unit 73 to move the milling head 72 toward the periphery of the shaped object 3 as shown in FIG. 2B. Then the surface of the shaped object 3 is removed by the cutting tool 71. This step corresponds to the removing and finishing step (step S5) illustrated in FIG. 3. Thereafter, the operation shown in FIG. 2C is returned back to the operation shown in FIG. 2A. At the end of the step S5 illustrated in FIG. 3, determination is made as to whether the shaping operation has been completed (step S6). If not, the layer number i is initialized (step S7) and the flow returns back to the step S1 to repeat the afore-mentioned steps. In this way, the formation of the solidified layer 22 and the removal of the surface of the shaped object 3 are repeated until the shaping operation comes to an end.

Figure 4E:
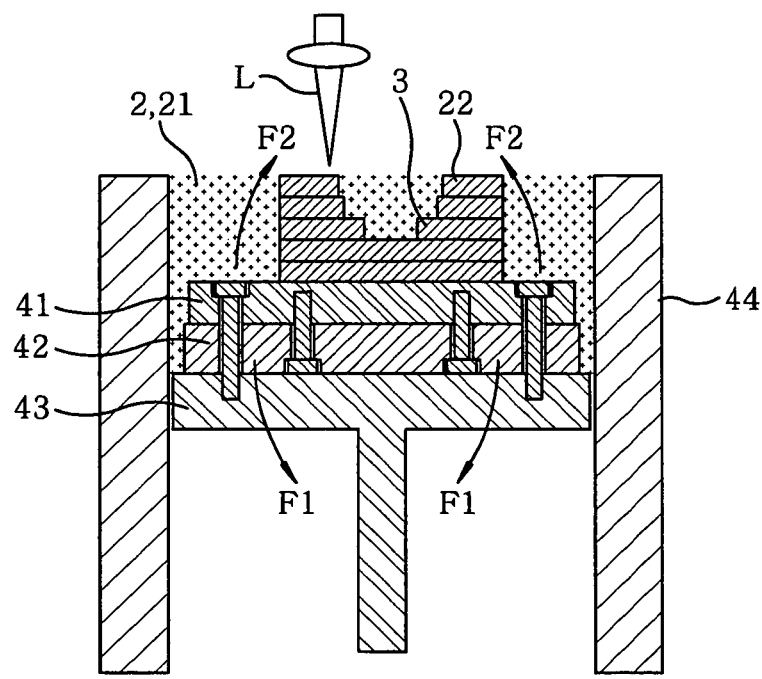
FIG. 4E is a section view showing the optical shaping machine in operation.

The operation by which the substrate 41 is attached to the table 43 prior to the powder layer laminating step of the afore-mentioned production method will be described with reference to FIGS. 4A through 4F. Shown in FIG. 4A is the cross section of the substrate 41. The substrate 41 is cut by a cutting operation as one of machining works to have a downwardly bent peripheral portion. The bent shape of the substrate 41 is set by anticipating the thermal stress generated in the substrate 41 during the shaping operation, so that the deformation amount of the substrate 41 at the end of the shaping operation becomes smaller. FIGS. 4B and 4C show the cross section of the substrate 41 attached to the installation plate 42. The installation plate 42 is made of a material with high rigidity. The concave surface of the substrate 41 is placed on the installation plate 42. The installation plate 42 has through-holes 42b through which bolts 42a can pass, while the substrate 41 has thread holes with which the bolts 42a can engage. The substrate 41 is pressed against the installation plate 42 by the bolts 42a and elastically deformed into a generally planar shape. This elastic deformation generates a tensile stress on the lower surface of the substrate 41 and a compression stress on the upper surface thereof. A downward bending moment F1 is generated in the peripheral portion of the substrate 41 by the tensile stress and the compression stress.

FIG. 4D shows the cross section of the optical shaping machine 1 in which the substrate 41 and the installation plate 42 are attached to the table 43. The substrate 41 and the installation plate 42 have through-holes 41a and 42c, respectively. Bolts 41b are inserted through the through-holes 41a and 42c and fixed to the table 43. The substrate 41 is pressed against the installation plate 42 by the bolts 41b and elastically deformed into a generally planar shape. This elastic deformation generates a downward bending moment F1 in the peripheral portion of the substrate 41. The step of forming the peripheral portion of the substrate 41 into a downwardly bent shape and the step of attaching the substrate 41 to the table 43 in a generally planar shape, both of which are shown in FIGS. 4A through 4D, constitute a stress applying step.

Figure 4F:
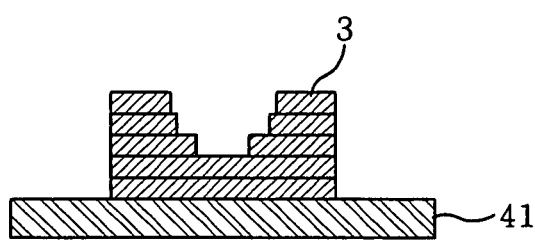
FIG. 4F is a section view showing a shaped object.

FIG. 4E shows the cross section of the optical shaping machine 1 in operation. The light beam L is irradiated on the powder layer 21 to the solidified layer 22. The solidified layers 22 thus formed are laminated one above another to produce the shaped object 3. The sintered portions in the shaped object 3 are shrunken when they are cooled. This generates a tensile stress by, which the surface of the substrate 41 bonded to the shaped object 3 is pulled toward the center. An upward bending moment F2 is generated in the peripheral portion of the substrate 41 by the tensile stress. The upward bending moment F2 offsets the downward bending moment F1 generated in the substrate 41 during the stress applying step. FIG. 4F shows the cross section of the shaped object 3 detached from the installation plate 42 after the shaping operation. Since the downward bending moment F1 and the upward bending moment F2 are offset by each other, the bending moment acting in the substrate 41 becomes smaller, which makes it possible to suppress the post-shaping warp and deformation of the substrate 41 and to reduce the possibility of the shaped object 3 becoming poor in shape.

As described above, the substrate 41 is formed into a bent shape by a cutting operation as one of machining works. This makes it possible to form the substrate 41 into a specified shape with high accuracy and also to suppress the post-shaping warp and deformation of the substrate 41. Alternatively, the peripheral portion of the substrate 41 may be bent downwards by a bending operation as one of machining works and not by the cutting operation. This provides the same effects as available in case where the substrate 41 is formed into a bent shape by the cutting operation.

Figure 5A:
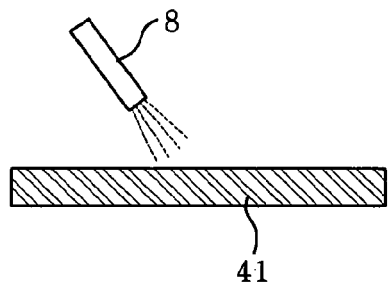
FIG. 5A is a view illustrating a heating operation during which the substrate used in the production method of the first embodiment is heated by a gas burner.
Figure 5B:
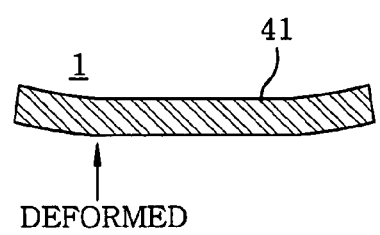
FIG. 5B is a section view showing the substrate which has undergone the heating operation.

As a further alternative example, the step of forming the peripheral portion of the substrate 41 into a downwardly bent shape may be performed by a heat treatment and not by the machining works. FIG. 5A illustrates a heating operation by which the substrate 41 is subjected to a heat treatment, and FIG. 5B shows the cross section of the substrate 41 which has undergone the heating operation. The central area of one surface of the substrate 41 on which the shaped object 3 will not be placed is heated by a heating device (or a heating unit) 8 such as a gas burner or the like. The central area of the substrate 41 is shrunken by a cooling operation performed after the heating operation. Thus the peripheral portion of the substrate 41 is bent in the direction of the heated surface. This provides the same effects as available in case where the substrate 41 is formed into a bent shape by the machining works. Since the substrate 41 is bent by the heat treatment, it is possible to form the substrate 41 within a shorter time than required in the machining works.

Figure 6A:
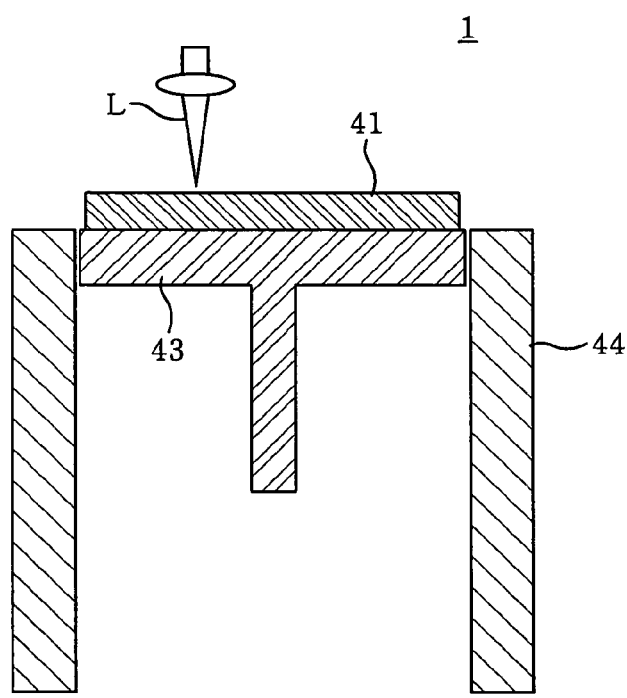
FIG. 6A is a view illustrating a light beam irradiating operation performed with respect to the substrate used in the production method of the first embodiment.
Figure 6B:
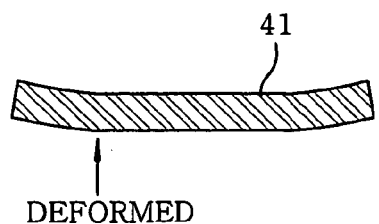
FIG. 6B is a section view showing the substrate which has been subjected to the light beam irradiating operation.

An operation in which the substrate 41 is subjected to a heat treatment by the irradiation of a light beam will now be described with reference to FIGS. 6A and 6B. Shown in FIG. 6A is the cross section of the optical shaping machine 1. The substrate 41 is mounted on the table 43. The central portion of one surface of the substrate 41 is heated by the irradiation of the light beam L. FIG. 6B shows the cross section of the substrate 41 which has undergone the heating operation. The central portion of the substrate 41 thus heated is shrunken as it is cooled after the heating operation. Thus the peripheral portion of the substrate 41 is bent in the direction of the surface on which the heating operation has been performed. Since the substrate 41 can be deformed by the light beam L used in the shaping operation, there is no need to employ an additional heating device, which-assists in reducing the cost.

When the substrate 41 is heated by the light beam L, it is preferred that the light beam L is irradiated along substantially the same route as the irradiation route of the light beam L used in the solidified layer forming step. It is also preferred that the light beam L is irradiated to the surface opposite to the surface on which the light beam L is irradiated in the solidified layer forming step. The magnitude of the bending moment F2 generated in the substrate 41 by the irradiation of the light beam L during the solidified layer forming step is greater when forming a lower solidified layer closer to the substrate 41 than when forming an upper solidified layer farther from the substrate 41. In the stress applying step, therefore, the irradiation of the light beam L may be performed to follow substantially the same route as the irradiation route of the light beam L used in the solidified layer forming step, when irradiating the light beam L on the irradiation route of the lower solidified layer to be formed in the solidified layer forming step. The irradiation of the light beam L in the stress applying step may be omitted with respect to the irradiation route of the upper solidified layer to be formed in the solidified layer forming step. The output power of the light beam L may be increased when irradiating the light beam L on the irradiation route of the lower solidified layer but may be reduced when irradiating the light beam L on the irradiation route of the upper solidified layer.

With the stress applying method mentioned above, substantially the same irradiation portion as that to be irradiated in the solidified layer forming step is irradiated by the light beam L to the opposite surface of the substrate 41. Thus, the upward bending moment F2 imparted in the solidified layer forming step and the downward bending moment F1 imparted in the stress applying step are apt to be generated in the same portion and at the same magnitude. As a consequence, the downward bending moment F1 and the upward bending moment F2 are offset by each other, making it possible to suppress the post-shaping warp and deformation of the substrate 41.

Figure 7A:
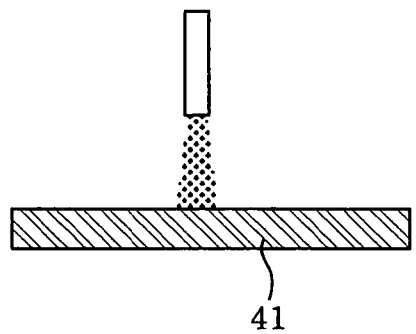
FIG. 7A is a view illustrating a shot blast operation performed with respect to the substrate used in the production method of the first embodiment.
Figure 7B:
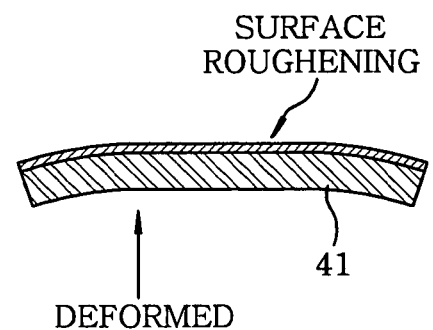
FIG. 7B is a section view showing the substrate which has been subjected to the shot blast operation.

The step of forming the substrate 41 to have a downwardly bent peripheral portion may be performed by shot blast. FIG. 7A illustrates a shot blast operation performed with respect to the substrate 41 and FIG. 7B shows the cross section of the substrate 41 which has been subjected to the shot blast operation. The term "shot blast" refers to a method by which processing is performed by attacking a workpiece with the granules referred to as shots. Examples of the shots include hard metal particles, ceramic particles and glass beads. The shot blast is mainly used in what is called grinding in a broad sense, including removal of burrs left in a workpiece, surface grinding and pattern forming such as surface roughening or the like. The shot blast is also employed in applying a residual compression stress to the surface of a metallic body to thereby enhance, e.g., the fatigue strength of springs or gears and the resistance to stress, corrosion or crack.

As shown in FIG. 7A, the shot blast is performed with respect to one surface of the substrate 41 on which the shaped object 3 is placed. As a result, a compression stress is generated on one surface of the substrate 41, thereby causing the peripheral portion of the substrate 41 to be bent in the direction of the surface on which no shot blast is performed, as shown in FIG. 7B. This provides the same effects as available in case where the substrate 41 is formed into a bent shape by the machining works or the heat treatment. Since the surface roughness of the substrate 41 is increased by the shot blast, the substrate 41 and the solidified layer 22 firmly adhere to each other. This reduces the possibility of separation of the shaped object 3 and the substrate 41.

Second Embodiment

Figure 8:
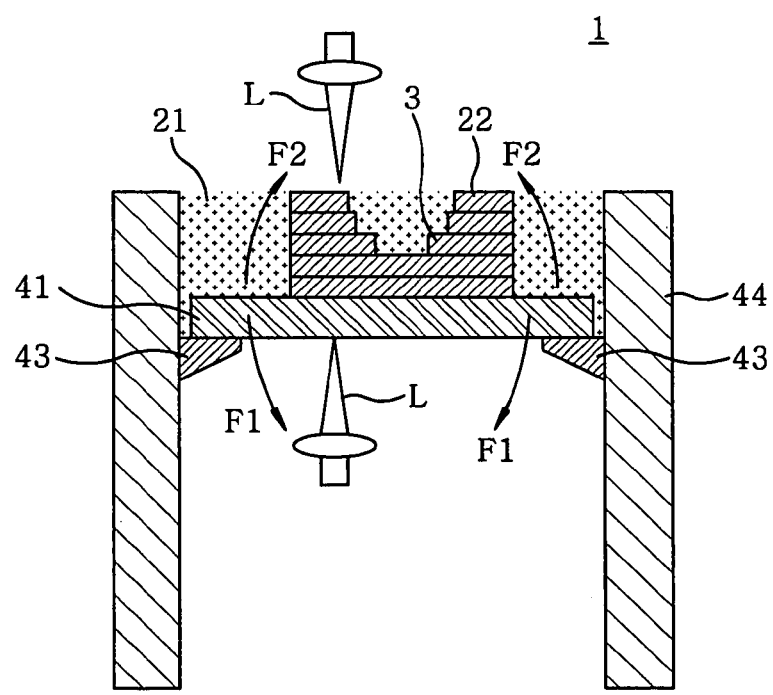
FIG. 8 is a section view showing an optical shaping machine used in a production method in accordance with a second embodiment of the present invention, in which view the optical shaping machine is in operation.
Figure 9A:
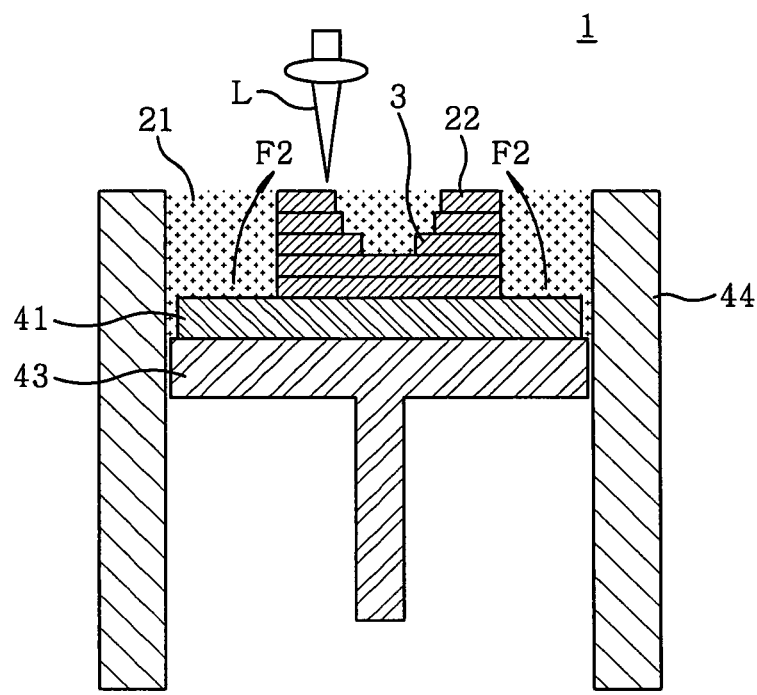
FIG. 9A is a section view showing an optical shaping machine used in a conventional production method.
Figure 9B:
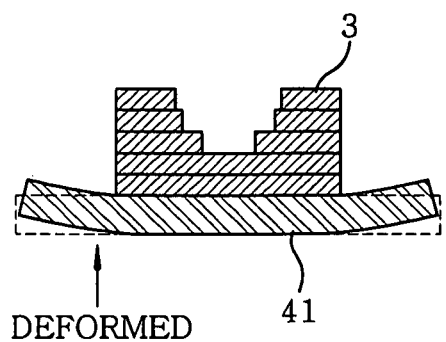
FIG. 9B is a section view showing a shaped object produced by the conventional production method.

A method for producing a shaped object in accordance with a second embodiment of the present invention will now be described with reference to FIG. 8. Shown in FIG. 8 is the cross section of the optical shaping machine 1. In the present embodiment, the substrate 41 is directly mounted on the table 43 which in turn holds the peripheral portion of the substrate 41 in place. The central area of the rear surface of the substrate 41 is opened downwards. The optical shaping machine 1 includes a solidifying unit for irradiating the light beam L on the rear surface of the substrate 41. The control unit performs its control operation so that the light beam L is also irradiated on the rear surface of the substrate 41 while the powder layer 21 on the substrate 41 is irradiated by the light beam L in the solidified layer forming step. At this time, it is preferred that the light beam L is irradiated from below along substantially the same irradiation route as that of the powder layer 21. Preferably, the output power of the light beam L irradiated on the rear surface of the substrate 41 is changed depending on the layer number of the powder layer 21 to be irradiated.

Since the substrate 41 is heated from the opposite surfaces thereof, with the same kind of heat source, the downward bending moment F1 and the upward bending moment F2 are generated in a generally equal magnitude and are offset by each other. This makes it possible to suppress the post-shaping warp and deformation of the substrate 41.

The present invention shall not be limited to the configurations of the foregoing embodiments but may be modified in many different ways without departing from the scope of the invention. For example, the substrate 41 fixed to the table 43 may be planar in outward appearance but may have an internal stress that tends to bend the peripheral portion of the substrate 41 in the downward direction. This internal stress offsets the upward bending moment generated in the shaping process, which makes it possible to suppress the warp and deformation of the substrate 41. The optical shaping machine 1 may not include the cutting and removing unit and may be designed to perform only the sintering operation. In the first embodiment, the substrate 41 may be directly attached to the table 43. By doing so, the time otherwise required in attaching the substrate 41 to the installation plate 42 can be saved in case where the substrate 41 shows reduced warp or deformation and the table 43 has increased rigidity. This makes it possible to reduce the possibility of the shaped object becoming poor in shape.

What is claimed is:

1. A method of producing a three-dimensionally shaped object having a plurality of solidified layers laminated one above another, comprising:
   applying a stress to a substrate by forming the substrate into a bent shape having a downwardly bent peripheral portion and then fixing the substrate to a rigid table so that the top surface of the substrate becomes substantially planar;
   forming a powder layer by feeding a powdery material to the top surface of the substrate;
   forming a solidified layer by irradiating a light beam on a specified portion of the powder layer to sinter or melt the specified portion of the powder layer; and
   repeating the powder layer forming step and the solidified layer forming step to produce a three-dimensionally shaped object having a plurality of solidified layers laminated one above another;
   wherein a bending moment caused by a thermal stress generated in the substrate during the layers formation is offset by the bending moment caused by the stress applied to the substrate from forming the substrate into the bent shape, thereby a substantially planar surface is achieved between the substrate and the solidified layers.

2. The method of claim 1, wherein the substrate is formed into a bent shape by a machining work.

3. The method of claim 1, wherein the substrate is formed into a bent shape by heating the bottom surface of the substrate with a heating unit.

4. The method of claim 3, wherein the heating unit is configured to irradiate a light beam.

5. The method of claim 4, wherein the heating unit irradiates the light beam on the bottom surface of the substrate along substantially the same irradiation route as a light beam irradiation route to be used in the solidified layer forming step.

6. The method of claim 1, wherein the substrate is formed into a bent shape by performing shot blast on the top surface of the substrate.

* * * * *